Oct. 13, 1970     J. C. DOWNEY ET AL     3,534,199

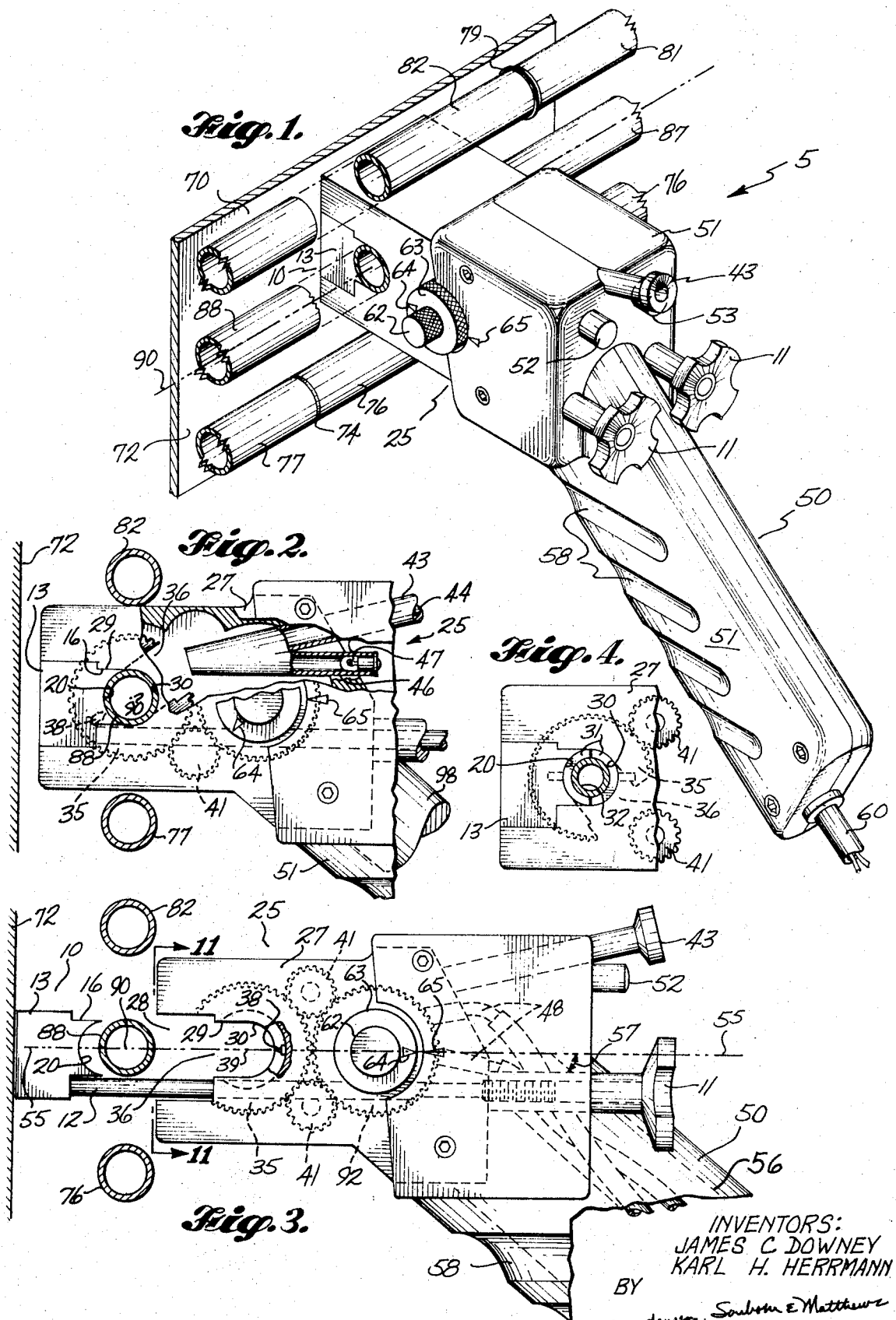

IN-PLACE TUBE WELDING TORCH

Filed Nov. 12, 1968     2 Sheets-Sheet 2

INVENTORS:
JAMES C. DOWNEY
KARL H. HERRMANN
BY
Christensen, Sanborn & Matthews
ATTORNEYS

United States Patent Office

3,534,199
Patented Oct. 13, 1970

3,534,199
IN-PLACE TUBE WELDING TORCH
James C. Downey, Auburn, and Karl H. Herrmann, Seattle, Wash., assignors to The Boeing Company, Seattle, Wash., a corporation of Delaware
Filed Nov. 12, 1968, Ser. No. 774,969
Int. Cl. B23k 9/02
U.S. Cl. 219—60          18 Claims

ABSTRACT OF THE DISCLOSURE

A circumferential welder for joining workpieces, having a circular cross-section, is disclosed along with a workpiece clamping system. The welding electrode, which is referred to herein as the welding tip, is mounted on a carrier ring having a sector cut away for lateral workpiece insertion and removal. A carrier drive system includes a provision for disconnecting a power drive permitting manual rotation of the carrier. A viewing system permits visual checking of welder and workpiece joint alignment and of welded joint development. Inert gas may exit from the joint through the veiwing system. A cooling fluid may be circulated in the welder around the tip carrier to prevent distortion. The workpiece clamp may be a self-contained part of the welder or a separate subcomponent providing guiding elements for quick welder alignment. The handle of the welder is angled from the clamping axis for operator convenience and more versatility in locating the welding unit in a tube or duct workpiece assembly.

FIELD OF THE INVENTION

This invention relates to arc welding and has particular relationship to the art of joining in place the adjacent ends of two workpieces having a circular cross-section.

Description of the prior art

In-place arc welding of circular tubing has been suggested as the best joining process for joining hydraulic tubes used in aircraft to eliminate the weight and vibration-caused leakage of previously used threaded connectors for such joints. However, the design of in-place welders has to date included rather complicated structures requiring two much clearance between adjacent installed hydraulic lines and other structures and too much fastening time for accurately setting up each welder clamp. Such welders, therefore, have only been useful in making in-place joints in systems where there is a relatively large clearance among the tubes being joined and other conduits and structures to permit the clamping assemblies to be opened and where the slowness of joint formation did not rule out such a long fabrication set-up time.

In addition to the space requirements and slow setup times for in-place tube welders, it is a time consuming and therefore expensive process to properly align the plane of the joint between workpieces with the plane that is traversed by the welding tip of such prior known welders. Further, it has not been possible to inspect the development of the welded joint as it is being made since visibility of the joint is blocked by the structure of the prior known welding assemblies. Open arc welders are not considered safe in many production locations such as in work stations inside of an aircraft.

One of the more popular designs for in-place tube welders includes a nonconsumable tungsten welding tip which is supported in a sectored ring carrier rotatable within the welder and around the tube joint. The tubes are positioned in the welder by relative lateral movement between the abutted tubes and the ring carrier through the cutout sector. Since power drive systems are used to provide the motive power for the tip carrier at programmed welding speeds, it is often difficult to accurately position the carrier for ease of insertion and removal of the workpieces into and from the welding unit before and after the welding process takes place. This misalignment problem causes additional delay in setting up and completion of a particular welding position.

While it has been proposed that certain units of the welding assembly be preinstalled at the joint between workpieces with the carrier drive and electrical connections being separable therefrom, such systems do not save a great deal since the portions of the system clamped in place include the tip carrier which is an expensive component. Further, such units require a significant time for joining the carrier drive unit to the in-place clamp and carrier assembly.

Since an inert gas is commonly used to prevent atmospheric contamination of the welded joint, the lack of good circulation of the inert gas from the welding area, characteristic of previously used in-place welders, prevents other contaminating material from flowing away from the weld area.

The heat generated by the welding process often limits the number of joints which may be formed by any single welder without the retained heat causing dimensional distortion and overheating of heat sensitive parts of the welder.

OBJECTS AND SUMMARY OF THE INVENTION

In view of the space and long setup times required by known circumferential welders, it is the object of the instant invention to provide a generally improved in-place circumferential welder of a design suitable for joining circular cross-section workpieces in crowded assemblies at acceptable production speeds.

It is another object of the instant invention to provide an improved clamping system for in-place welders which accurately positions and holds circular cross-section workpieces in proper alignment relative to the welding assembly requiring the minimum amount of space to operate and a minimum amount of time for setting up and completing each particular weld.

It is a further object of the instant invention to provide a generally improved in-place welder having a shielded arc but including a viewing system for visual joint alignment checking and weld inspection.

It is yet another object of the instant invention to provide an exit route for increased circulation of inert gas used in a shielded arc portable welder.

It is an additional object of the instant invention to provide a generally improved in-place welder which includes a power drive system for rotating the welding tip carrier around the workpiece with the additional provision of a disconnect system permitting manual rotation of the tip carrier for quick clamp up and workpiece removal operations.

A related feature of the instant invention is the provision of a portable in-place circumferential welder which includes a welding head assembly and a gripping handle which extends from the welding head at an angle for ease of positioning the welding head, permitting welding to take place in substantially any position.

A still further object of the instant invention is the provision of separate clamping fixtures which include quick engaging alignment elements permitting the joints to be welded to be clamped and accurately positioned by the fixtures such that the welding head assembly can be moved from one fixture to another for maximum utilization of the welding head while still forming accurate welded joints between circular cross-section workpieces at greatly increased production speeds.

An additional object of the instant invention is to provide a generally improved in-place circumferential welder which includes means for cooling temperature sensitive parts thereof permitting continuous production usage without reducing the dimensional accuracy of the welds.

In accordance with the present invention, a portable circumferential welder is provided which includes a welding head assembly, containing the welding tip carrier ring and drive mechanism, a clamping assembly and a positioning handle. The nonconsumable welding tip is upported by a rotatable carrier which is mounted within the welding head assembly. The head assembly includes clamping surfaces which are curved to engage a portion of the peripheral surfaces of the circular cross-section workpieces on each side of the joint being welded. A drive system in the welding head rotates the tip carrier about an axis coincident with the axes of the workpieces when they are held in clamping engagement with the clamping surfaces of the welding head assembly. The clamping assembly may be formed as an adjustable opening cap member extendible from the welding head assembly or it may also be formed as a separable clamping fixture providing guiding engagement with the welding head assembly for proper alignment between the clamped workpieces and the welding tip carrier. In the attached form the clamping assembly includes arcuate grasping surfaces which are oppositely formed to correspond with the clamping surfaces of the welding head assembly. As a fastening guiding attachment between the clamping assembly and welding assembly is adjusted, the workpieces are drawn into engagement between the clamping member's grasping surfaces and the welding head's clamping surfaces until the axes of the workpieces are coextensive with the axis of the welding tip carrier.

The welding tip carrier has a sector removed to permit lateral insertion of the workpieces into and removal out of the center of the ring. The proper positioning of the cutaway sector of the tip carrier is made possible through a manually operable carrier drive system. The carrier drive system is also subject to rotation by a drive motor through a manually selected engagement between a drive motor mounted in the handle assembly and the carrier drive system.

The welding head assembly also includes a viewing tube extending from the exterior of the welding head assembly into a position in the assembly adjacent to the path of the tip carrier. As the opened sector of the tip carrier is positioned in registry with the axis of the viewing tube, it is possible for the operator to view a portion of the workpieces positioned within the interior of the tip carrier. The viewing tube permits visual inspection of the alignment between the plane of the non-consumable welding tip and the plane of the joint between the two workpieces being joined by the welder. In addition, as the welding progresses every time that the cutout sector of the tip carrier is in registry with the end of the viewing tube, it is possible for the operator to visually inspect the weld in the joint between the adjacent workpieces. Since inert gases are commonly used to shield the welding area for preventing contamination from the atmosphere adjacent to the weld, it is possible that the inert gases can be circulated away from the interior of the tip carrier through the viewing tube. In addition, a light can be provided adjacent to the end of the viewing tube to illuminate the interior of the tip carrier.

Additional features of the improved welder include the provision of a loop of cooling medium adjacent to the race in which the tip carrier is guided for dissipation of the heat generated in the welding process to insure dimensional stability and long usage of the welder without inaccuracies duto to heat generated distortion. The handle extends at an angle from the clamping axis, that is the lateral plane in which the workpieces and the clamping surfaces move relative to one another during the insertion and removal of the workpieces from the welding assembly. This angular relationship between the head assembly and handle assembly provides better visibility for the operator in positioning the welding assembly. The control buttons initiating the power drive rotation of the carrier tip and the electrical connection between the welding current source and the welding tip can be provided at the welding head assembly for easy operation by the operator whose hand is grasping the welder around the handle portion.

These and other features and objects of the invention will become more clearly apparent from the following detailed description thereof, which is to be read with reference to the accompanying drawings.

BRIEF DESCRIPTION OF THE DRAWINGS

In the drawings:

FIG. 1 is an isometric view illustrating the improved welder made in accordance with the present invention as it is being used to circumferentially weld two circular cross-section workpieces;

FIG. 2 is a side elevation view illustrating the welding head assembly and clamping assembly shown in FIG. 1 in a position wherein the weld joint between the circular cross-section workpieces can be inspected;

FIG. 3 is a view similar to FIG. 2 but showing the parts of the improved welding assembly and clamping assembly as the workpiece is being inserted into or removed from the welder made in accordance with the present invention;

FIG. 4 is a side elevation view illustrating clamping attachments which permit the utilization of the welder shown in FIGS. 1 and 3 for smaller diameter workpieces;

DESCRIPTION OF THE PREFERRED EMBODIMENT

Figure 6:
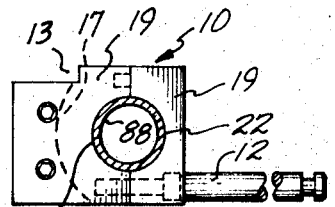
FIG. 6 is a side elevation view of the separable clamping assembly of FIG. 5 illustrating it in a closed clamping position.
Figure 5:
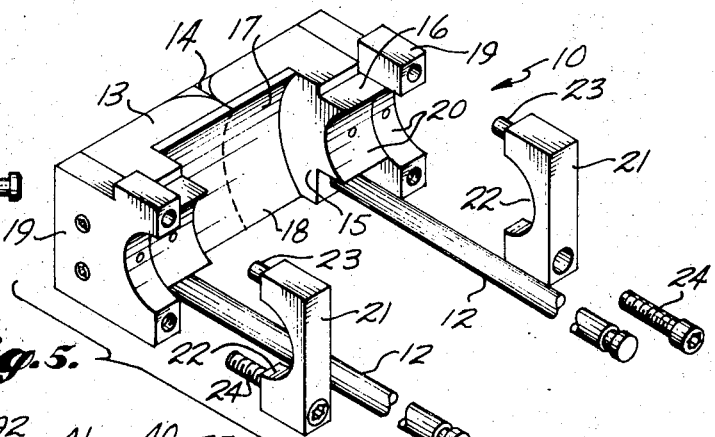
FIG. 5 is an isometric view illustrating a separable form of the clamping assembly useful with the improved welder made in accordance with the present invention.

As a guide to understanding this disclosure, it should be noted that the description is related to a single embodiment of the welding unit 5 with FIGS. 5 and 6 showing a modified separable clamping assembly 10 which can be installed at the site of each of the joints to be welded. The rest of the welding unit, minus its clamping assembly, is quickly movable from one preinstalled clamping assembly to another to make each individual weld.

As shown in FIG. 1, welding unit 5 includes a clamping assembly 10, a head assembly 25 and a handle assembly 50. To illustrate the capability of using this particular improved welding unit in crowded installations, there is shown in FIGS. 1 to 3 a structural member 72 positioned a short distance from the closely spaced tube sections 77, 88 and 82 which have been or are to be joined by welding to tube sections 76, 87 and 81, respectively. This is generally referred to as workpiece assembly 70. The finished welding joint 74 joining tube sections 76 and 77 is shown as an illustration of the clean lightweight joint provided by use of improved welding unit 5 as contrasted to the large threaded joint fittings previously used for such a workpiece assembly. A flange melt-down lug joint 79 is illustrated as the yet to be welded joint between tube sections 81 and 82 since this is one of the preferred configurations of a joint for use with the circumferential welding technique practiced by welding unit 5 of the instant invention. The target joint 85 shown in FIG. 7 between first workpiece 87 and second workpiece 88 is of a square butt type joint also suitable for joining by means of circumferential welding unit 5 of the instant invention.

As shown in FIG. 3, clamping assembly 10 is joined to the head assembly 25 by means of pull rods 12 which extend through housing 27 of head assembly 25 and are attached by means of a threaded or other suitable connection to closure nuts 11. Initially closure cap 13 is positioned as shown in FIG. 3 to permit the insertion of first workpiece 87 and second workpiece 88 into tube opening 28 defined by housing 27 of head assembly 25. Closure cap 13 includes arcuate grasping surfaces 20 and housing 27 includes opposed arcuate clamping surfaces 30. Preferably, grasping surfaces 20 and clamping surfaces 30 are formed with the same radius of curvature as the exterior surfaces of tubular workpieces 87 and 88. As closure nuts 11 draw pull rods 12 and closure cap 13 into housing 27, the position shown in FIG. 2 is assumed, whereat workpieces 87 and 88 are securely fastened between the grasping surfaces 20 of clamping assembly 10 and clamping surfaces 30 of housing 27. As these elements move relative to one another from the position shown in FIG. 3 to that shown in FIG. 2, the axis 90 of workpieces 87 and 88 is moved along and defines a clamping plane 55. In FIG. 2 the welding tip carrier axis 39 is coincident with workpiece axis 90.

If a smaller diameter workpiece 32, such as shown in FIG. 4, is to be welded, size reduction inserts 31 are attached to closure cap 13 and housing 27 to provide the workpiece clamping function.

Figure 11:
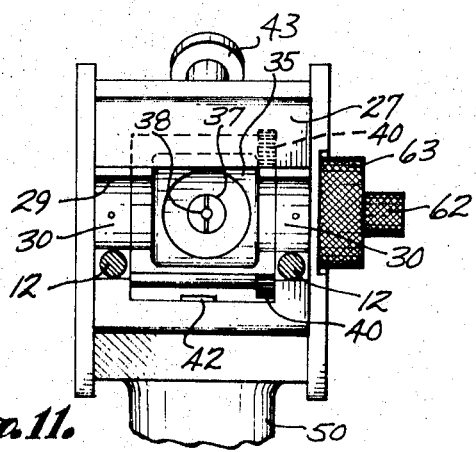
FIG. 11 is an end elevation view of the head assembly as seen from lines 11—11 of FIG. 3.

To insure coincident alignment of the operating plane of non-consumable welding tip 38, as it rotates supported by carrier ring 35 about workpieces 87 and 88 and carrier axis 39, and the plane of target joint 85 between workpieces 87 and 88, there is provided an inspection tube 43 projecting through housing 27, as shown in FIG. 2. Tube 43 is formed of a transparent or hollow member to define a sighting channel 44 through which the operator views the interior of carrier ring 35 and compares the position of the plane of tip 38 as indicated by eyepiece index marker 45, shown in FIG. 7, with the plane of target joint 85. To provide adequate light so that the joint 85 can be seen, a light tube 46 communicates a beam of light from the light 47 positioned at one end of tube 46 to the joint area illuminated at its other end. It should be understood that carrier ring 35 which supports welding tip 38 through its tip support structure 37 is basically a cylindrical member having a sector opening 36 cut away therefrom. Workpieces 87, 88 are inserted into carrier ring 35 when sector opening 36 is in the position shown in FIG. 3. The operator can view the interior of carrier ring 35 through tube 43 when sector opening 36 is in the position shown in FIG. 2. The construction of carrier ring 35 is not shown in great detail since similar rings have been used in circumferential welders common to the knowledge of those skilled in the art. It should be noted that it is common practice in the design of circumferential welders to use a sectored carrier ring for adjustably supporting a non-consumable welding tip such as welding tip 38. An electrical lead from the welding console contacts a conductor strip or brush 42, such as shown in FIG. 11, which extends around the circumference of carrier ring 35 for providing the electical potential to welding tip 38.

In the use of circumferential welding equipment it is often necessary that an inert gas be supplied to the welding area to prevent contamination from the oxygen and other materials in the atmosphere adjacent to the workpiece joint. Argon is a common gas for such arc shielding and is generally supplied through the handle assembly of the welder. The escape of the inert gases is not detrimental to the operator but without a provision being made for a clear path for the inert gas its presence may be a source of undue pressure within the welding assembly which may add to the distortion due to high temperature and the breakdown of lubrication of moving parts. For this reason welding unit 5 of the instant invention provides, through sighting channel 44 of inspection tube 43, an easy circulation route for the dissipation of the inert gases from the weld area. Of course, an eyepiece of plexiglass or similar material could be placed in the operator end of inspection tube 43 and vent openings could be made in the side walls of tube 43 for communicating sighting channel 44 with the outside atmosphere for easy exit of the inert gases.

In order that the high temperatures, which are developed through production use of the nonconsumable welding tip 38, do not cause distortion of the welder 5, the generated heat is dissipated through cooling tubes 48 which extend through the housing 27 adjacent to the carrier ring 35 as shown in FIG. 3. Water and other suitable cooling mediums may be circulated through tubes 48. It is therefore seen that the services provided to head assembly 25 may include the electrical current to operate the light 47 for the inspection tube 43 and to operate welding tip 38; the inert gas to shield the welding area; the cooling medium to dissipate the heat through the conduit 48; as well as the power for the carrier drive system which will be described in more detail with reference to FIGS. 8 through 10. All of these services are appropriately communicated to handle assembly 50 through a service conduit 60.

With general reference to FIG. 1 illustrating handle assembly 50, it is noted that an electrically nonconductive casing 51 extends angularly from housing 27 to enclose handle assembly 50 and includes openings for the positioning of appropriate controls including inspection tube 43, ring rotation and welding control button 52 and sighting light button 53. The axis of handle 50 is identified generally at 56 in FIG. 3. As shown, handle axis 56 depends from clamping plane 55 at an extension angle 57 of approximately 45°. This relationship between clamping plane 55 and handle 50 provides good visibility and convenient operator positioning of welding assembly 5 as he grasps the finger grips 58 formed in housing 51.

With reference to FIGS. 5 and 6, it should be noted that clamping assembly 10 can be separated from head assembly 25 of the welding unit 5 such that individual closure caps 13 may be selectively positioned along workpiece assembly 70 before head assembly 25 and handle assembly 50 are needed. As shown, closure cap 13 may include a cap index marking 14 which locates the plane of the movement of welding tip 38 with respect to the pull rods 12 of clamping assembly 10. Guide arms 15 extend away from the main body of the closure cap 13 and include upper guide surfaces 16 which when assembled with head assembly 25 are positioned in force transmitting contact with guiding surfaces 29 of housing 27 as shown in FIG. 2. The side and top surfaces of arms 15 as well as the pull rods 12 each may perform the function of alignment means for aligning clamping assembly 10 with head assembly 25. A ring cavity is defined between the guide arms 15 and the ring race plate 18 so that carrier ring 35 has enough room to rotate around ring axis 39 and workpiece axis 90 between closure cap 13 and workpieces 87, 88. The ends of guide arms 15 are shaped to form grasping surfaces 20 which make intimate contact with workpieces 87, 88 during the welding operation as previously described. To the extent that it has been described thus far, clamping assembly 10 corresponds with that shown in FIGS. 1 to 3. It should be noted, however, that without some structural elements which are equivalent to clamping surfaces 30 formed by housing 27 there would not be sufficient elements available for properly grasping and holding together workpieces 87 and 88. To provide such structural elements for the self supporting separable clamping assembly 10, as shown in FIGS. 5 and 6, there are provided extension members 19 and segment closure members 21 positioned at opposite ends of closure cap 13. Extension members 19 also include grasping surfaces 20 which constitute an extension of grasping surfaces 20 of guide arms 15. Segment closure members 21 include clamping surfaces 22 which are opposed to grasping surfaces 20 with both grasping surface 20 of extension member 19 and clamping surfaces 22 of closure members 21 having the same radius of curvature as that of the exterior surfaces of workpieces 87 and 88. As guide pins 23 projecting from segments 21 and fastening members 24 are inserted into the appropriate apertures formed in extension members 19 a complete self-contained clamping assembly 10 is established which is suitable for grasping and holding together first and second workpieces 87 and 88 with cap index marking 14 positioned in registry with target joint 85. In this manner self-contained clamping assemblies 10 can be positioned along a workpiece assembly 70 as needed to clamp together the joints to be welded by circumferential welding unit 5 and at a later time head assembly 25 can be brought to workpiece assembly 70 with the pull rods 12 being inserted through the pull rod apertures formed in the housing 27 and secured by means of the closure nuts 11 or other suitable grasping mechanisms so that a circumferential welding operation might take place. With such self-contained clamping assemblies it is not necessary that the welder be involved in the time consuming operation of aligning and clamping together of the workpieces which are to be welded. This results in increased efficiency in the utilization of the more expensive components of head assembly 25 and handle assembly 50.

Figure 8:
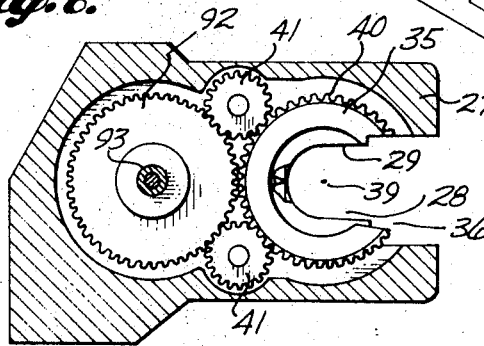
FIG. 8 is a side elevation view of the welding head assembly, with some parts removed for clarity, illustrating a drive system for the welding tip carrier.
Figure 9:
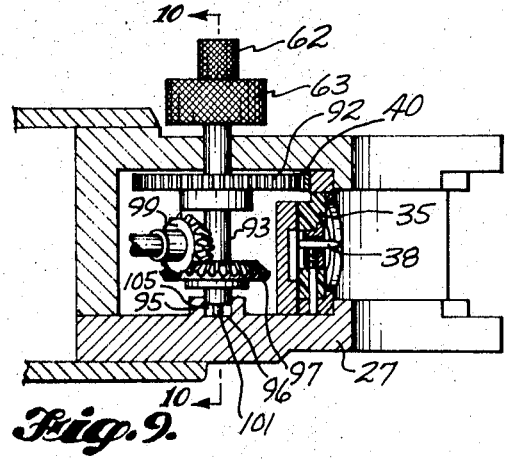
FIG. 9 is a bottom plan view of the welding head assembly, with some parts shown in section, illustrating the drive system for the welding tip carrier with the power drive engaged.
Figure 10:
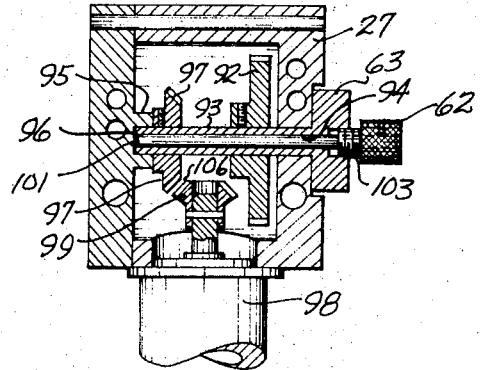
FIG. 10 is an end section view of the carrier drive system as seen from lines 10—10 of FIG. 9, but illustrating the disengaged position of the components thereof permitting manual operation of the welding tip carrier.

The carrier ring drive system is shown with reference to FIGS. 8 to 10. It should be noted that carrier ring 35 includes a carrier ring gear 40 which receives torque from and therefore is rotated by engagement of the teeth of the carrier ring gear 40 with the teeth of either or both of intermediate gears 41. It is necessary that there be a plurality of intermediate gears 41 since a portion of carrier ring gear 40 is missing due to sector opening 36 formed in carrier ring 35. Thus, as shown in FIG. 4, sector 36 is opposite lower intermediate gear 41 but upper intermediate gear 41 is in driving engagement with the teeth of carrier ring 40. In the construction shown, either one or both intermediate drive gears 41 is always in mesh with carrier ring gear 40. In addition, each intermediate gear 41 is also in mesh with the teeth of ring drive gear 92. A hollow drive shaft 93 is positioned with its axis parallel to carrier axis 39. Keyed to shaft 93 is ring drive gear 92 at one end and bevel gear 97 adjacent to its other end, as best shown in FIG. 10. A drive motor 98 is supported within housing 51 of handle assembly 50 and extends into housing 27 of head assembly 25 with a beveled drive pinion gear 99 which is selectively engaged by bevel gear 97. At one end of hollow drive shaft 93 is positioned end bushing 95, having an end wall 96, and at the other end, and also keyed to shaft 93, is manual carriage control knob 63. Hollow drive shaft 93 defines a center chamber 94 through which passes throw-out rod 101 which is attached at one end to drive control knob 62 which in turn is joined by means of threaded connection 103 to drive shaft 93.

If it is desired that there is a driving relationship established between drive motor 98 and carrier ring 35, drive control knob 62 is rotated relative to knob 63 such that the throw-out rod 101 is extended into engagement with bushing end wall 96 moving the drive shaft 93 outwardly such that bevel gear 97 engages drive pinion bevel gear 99. This condition is shown in FIG. 9. However, if it is desired that carrier ring 35 be rotated without the intereference from drive motor 98, this is easily accomplished by oppositely turning control knob 62 relative to manual carriage control knob 63 such that throw-out rod 101 is withdrawn into shaft 93 so that the end of shaft 93 may be inserted in contact with bushing end wall 96. This condition, as shown in FIG. 10, permits the rotation of shaft 83 by means of the operator's rotation of a manual drive means in the form of manual carriage control knob 63. Rotation of shaft 93, which functions as a torque transferring means, causes ring drive gear 92 to rotate intermediate gears 41 resulting in the rotation of ring carriage gear 40 to select the proper position of carrier ring 35 and particularly the position of sector opening 36 or welding tip 38. Drive control knob 62 and rod 110 therefore perform the function of drive mode selection means. For operator convenience tip location marker 64 is positioned on an external surface of carriage control knob 63 to indicate the position of welding tip 38. A housing index marker 65 is positioned on head assembly 25 to indicate, when aligned with marker 64, the component position suitable for inserting or removing workpieces, as shown in FIG. 3.

Figure 7:
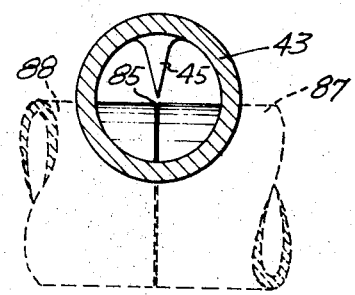
FIG. 7 is a schematic illustration of the operator's view through the viewing tube made in accordance with the instant invention.

In operation, utilizing clamping assembly 10 attached to head assembly 25 such as shown in FIGS. 1 to 3, the operator positions welding unit 5 with clamping assembly 10 opened to the position shown in FIG. 3. Workpieces 87, 88 are inserted into tube opening 28 formed in the housing 27 by relative movement between head assembly 25 and workpiece assembly 70. Closure nuts 11 take up on the pull rods 12 to pull closure cap 13 toward the carrier axis 39 until workiece axis 90 is coincident with the carrier axis 39. At this point grasping surfaces 20 of clamping assembly 10 engage a portion of the outer surfaces of workpieces 87, 88 while opposed corresponding clamping surfaces 30 formed in housing 27 grasp another portion of the exterior surfaces of workpieces 87, 88. Guide surfaces 16 of clamping assembly 10 are, as shown in FIG. 2, in intimate force transmitting relationship with the guiding surface 29. The operator then rotates drive control knob 62 to insure that there is a disengagement clearance 106 established between bevel gears 97 and 99 with the end of drive shaft 93 in abutting relationship with bushing end wall 96 as shown in FIG. 10. At this time the operator rotates manual carriage control knob 63 until tip location marker 64 is in the position shown in FIG. 2 which indicates that sector opening 36 of ring carriage 35 is positioned adjacent the end of inspection tube 43. In this position the operator sights down sighting channel 44 to obtain a view, such as shown in FIG. 7, of joint 85 between the workpieces 87 and 88. If eyepiece indicator marker 45 indicates that the plane of the joint 85 is coincident with the plane of the welding tip 38 no further adjustment is required. For better visibility light 47 may be turned on by means of the operator's pushing of sighting light button 53. If, however, there is a misalignment, the tension on pull rods 12 is released slightly by incremental turning of closure nuts 11 to permit the entire head assembly 25 to move axially along workpieces 87, 88 until the proper relationship between the plane of the welding tip 38, as represented by eyepiece index marker 45, is established. The tension of pull rods 12 is re-established by means of closure nuts 11. Prior to initiating power operation of carrier ring 35, it is necessary that drive control knob 62 be turned to extend throw-out rod 101 relative to drive shaft 93 to establish engagement clearance 105 between the end of drive shaft 93 and the bushing end wall 96 and to engage bevel gear 97 with drive pinion gear 99, as shown in FIG. 9. Once the proper joint and welding unit relationship is established and the power drive is engaged the operator can push ring rotation button 52 which indicates to the control console that the welding operation should commence at which time inert gas flows into the interior of carrier ring 35, the welding current is provided to the welding tip 38 establishing an arc with joint 85 and the carrier ring 35 is rotated about workpieces 87, 88.

During the welding operation, whenever tip locating marker 64 is in the position as shown in FIG. 2, the operator may turn on light 47 by pushing sighting light button 53 and view down through inspecton tube 42 to inspect the development of the weld being made. Inert gas may be directed into the welding area from handle assembly 50 and exited out through sighting channel 44 and a cooling medium is circulated through cooling conduits. At the end of the welding operation carrier 35 is rotated until tip locator marker 64 is positioned adjacent to housing index marker 65 which indicates that tip 38 and carrier cutout sector 36 are in the position, as shown in FIG. 3 which permits, upon opening of closure cap 13 away from housing 27, workpieces 87, 88 to be removed from welding unit 5 by relative movement between workpiece assembly 70 and welding unit 5.

A substantially identical sequence of operation is involved when utilizing the self-contained clamping assembly shown in FIGS. 5 and 6, except that the alignment steps are not required once cap index marker 14 has been positioned in alignment with the joint formed between adjacent workpieces.

We claim:

1. A circumferential welding apparatus comprising:
   a welding head assembly and clamping assembly in combination, said head assembly including a housing and a welding tip carrier rotatably supported within said housing;
   said housing providing clamping surfaces positioned axially of opposite ends of said carrier for firmly contacting the work-pieces on each side of the joint being welded and supporting means for said clamping assembly engaging said head assembly, said supporting means adapted to position said clamping assembly in a first open position to receive said workpiece, said supporting means comprising means for drawing said clamping assembly and said housing together into a second, closed position so that said workpiece becomes positioned coaxially within said welding tip carrier;
   said clamping assembly providing grasping surfaces spaced from one another substantially the same distance that said clamping surfaces of said housing are spaced for firmly contacting opposite sides of said workpieces from those contacted by said clamping surfaces.

2. The welding apparatus of claim 1 wherein said carrier comprises an annular gear member having an opening on one side thereof to admit a workpiece into axial relationship therewith.

3. The welding apparatus of claim 1 wherein:
   said grasping and clamping surfaces having the same radius of curvature as the exterior surfaces of said workpieces.

4. The apparatus of claim 1 wherein:
   said alignment means includes rod means secured to said clamping assembly and projecting through apertures formed in said housing.

5. The apparatus of claim 1 wherein:
   each of said housing and said clamping assemblies including opposed guiding surfaces engageable in force transmitting relationship to one another when the axis of said workpieces is coincident with the axis of said carrier to prevent distortion of the axial relationship between said workpieces and said carrier.

6. The apparatus of claim 1 including:
   handle means projecting from said housing at an angle of approximately 45° from the plane established by the axis of said workpieces as they are moved relative to said clamping surfaces.

7. The apparatus of claim 1 wherein:
   said head assembly also includes a viewing means projecting through said housing for permitting visual inspection of the interior portion of said carrier, and
   said carrier being cylindrical in form with a sectored portion cut away therefrom to permit passage therethrough of said workpieces and visual inspection therethrough from said viewing means.

8. The apparatus of claim 1 wherein:
   said head assembly including carrier drive means, and;
   said drive means including means for transferring torque inputs to said carrier to rotate said carrier, power drive means for applying power torque to said carrier through engagement with said torque transfer means, manual drive means for applying a manual torque to said carrier means through said torque transferring means, and mode selection means for selectively engaging and disengaging said power drive means from said torque transferring means.

9. In a circumferential welding apparatus comprising a head assembly and a clamping assembly, said head assembly comprising a housing and a sectored welding tip carrier rotatably supported within said housing, the improvement of supporting means for said clamping assembly engaging said head assembly, said supporting means adapted to position said clamping assembly in a first open position to receive said workpiece, said supporting means comprising means for drawing said clamping assembly and said housing together into a second, closed position so that said workpiece becomes positioned coaxially within said housing.

10. The apparatus of claim 9 and viewing means projecting through said housing for permitting visual inspection of the interior portion of said carrier through said sectored portion of said carrier.

11. The apparatus of claim 10 wherein:
    said viewing means being formed of a hollow member for permitting inert gases to circulate from said interior portion of said carrier out away from said housing, and including a light means for directing illuminating light into said interior.

12. The apparatus of claim 10 wherein:
    said viewing means including an indicator index means positioned in the plane established by the welding tip carried by said carrier for aligning the plane of the joint being welded with said welding tip.

13. The apparatus of claim 9 wherein:
    said housing including conduit means extending through said head assembly adjacent said carrier for circulating a cooling medium.

14. A circumferential welding apparatus comprising:
    a head assembly;
    a movable clamping assembly adapted to partly encircle a workpiece, and;
    supporting means for said clamping assembly engaging said head assembly;
    said head assembly comprising a housing, a welding tip carrier rotatably supported within said housing and a carrier drive means for rotating said carrier;
    said supporting means adapted to position said clamping assembly in a first open position to receive said workpiece, said supporting means comprising means for drawing said clamping assembly and said housing together into a second, closed position so that said workpiece becomes positioned axially within said welding tip carrier;
    said drive means including: means for transferring torque inputs to said carrier for rotating said carrier; power drive means for applying a power torque to said carrier through engagement with said torque transferring means; manual drive means for applying a manual torque to said carrier through said torque transferring means, and; mode selection means for selectively engaging and disengaging said power means from said torque transferring means.

15. The apparatus of claim 14 wherein:
said manual drive means and said mode selection means being positioned externally of said housing for manual operation thereof.

16. The apparatus of claim 14 wherein:
said manual drive means includes marking means visible from the exterior of said housing for indicating the rotational position of said carrier means.

17. The apparatus of claim 14 wherein:
said torque transferring means including a shaft means rotatably supported by said housing and axially movable therein, and;
said mode selection means including means for moving said shaft axially between an engagement position with said power drive means and a disengagement position away from said power drive means.

18. The apparatus of claim 17 wherein:
said shaft means being hollow and said axial movement means including a rod member positioned within the hollow portion of said shaft whereby extension of said rod member from one end of said shaft results in the axial movement of said shaft.

References Cited

UNITED STATES PATENTS

| 2,906,851 | 9/1959 | Kitrell | 219—60 |
| 3,179,781 | 4/1965 | Ross et al. | 219—60.1 |
| 3,194,936 | 7/1965 | Rohrberg et al. | 219—60.1 |
| 3,230,340 | 1/1966 | Glatthorn et al. | 219—125 |
| 3,238,347 | 3/1966 | Rohrberg et al. | 219—60.1 |
| 3,275,795 | 9/1966 | Bosna et al. | 219—60.1 X |
| 3,395,262 | 7/1968 | Kazlauskas | 219—125 X |
| 3,401,251 | 9/1968 | Ache et al. | 219—125 |

JOSEPH V. TRUHE, Primary Examiner

L. A. SCHUTZMAN, Assistant Examiner

U.S. Cl. X.R.

219—59, 125, 161